United States Patent
Sun et al.

(10) Patent No.: US 7,762,770 B2
(45) Date of Patent: Jul. 27, 2010

(54) HYBRID ACTUATOR FOR HELICOPTER ROTOR BLADE CONTROL FLAPS

(75) Inventors: Fanping Sun, Glastonbury, CT (US); Zaffir A. Chaudhry, South Glastonbury, CT (US); Jimmy Lih-Min Yeh, West Hartford, CT (US); Michael G. O'Callaghan, Manchester, CT (US); Ulf J. Jonsson, South Windsor, CT (US); Brian E. Wake, South Glastonbury, CT (US); Robert H. Dold, Monson, MA (US)

(73) Assignee: Sikorsky Aircraft Corporation, Stratford, CT (US)

( * ) Notice: Subject to any disclaimer, the term of this patent is extended or adjusted under 35 U.S.C. 154(b) by 811 days.

(21) Appl. No.: 11/638,980

(22) Filed: Dec. 14, 2006

(65) Prior Publication Data

US 2008/0145221 A1  Jun. 19, 2008

(51) Int. Cl.
B64C 27/615 (2006.01)
(52) U.S. Cl. .................................................. 416/23
(58) Field of Classification Search .............. 416/23, 416/24; 244/215, 39, 17.25
See application file for complete search history.

(56) References Cited

U.S. PATENT DOCUMENTS

| | | | |
|---|---|---|---|
| 6,109,870 A | 8/2000 | Yamakawa et al. | |
| 6,231,013 B1 * | 5/2001 | Jaenker | 244/215 |
| 6,499,690 B1 * | 12/2002 | Katayama et al. | 244/17.11 |
| 6,508,439 B1 | 1/2003 | Fink et al. | |
| 2005/0230534 A1 | 10/2005 | Pitt | |

FOREIGN PATENT DOCUMENTS

| | | | |
|---|---|---|---|
| JP | 10007099 A | * | 1/1998 |
| JP | 2001080588 | | 3/2001 |
| JP | 08156891 | | 2/2009 |

OTHER PUBLICATIONS

PCT International Search Report and written opinion mailed Dec. 6, 2007.

* cited by examiner

*Primary Examiner*—Ninh H Nguyen
(74) *Attorney, Agent, or Firm*—Carlson, Gaskey & Olds PC

(57) ABSTRACT

A helicopter rotor blade that has a blade body and a control flap secured to the blade body. The rotor blade has a first primary mover capable of generating a first linear motion that is sufficient to generate a high amplitude, low frequency motion of the control flap; and a second primary mover capable of generating a second linear motion that is sufficient to generate a small amplitude, high frequency motion of the control flap. Further, the rotor blade has a coupling transmission for combining the first linear motion with the second linear motion that generates a cumulative linear motion; and a second transmission device that causes the cumulative linear motion to rotate the control flap.

24 Claims, 3 Drawing Sheets

HYBRID ACTUATOR FOR HELICOPTER ROTOR BLADE CONTROL FLAPS

BACKGROUND OF THE INVENTION

1. Field of the Invention

The present disclosure relates to actuators for rotor blades of helicopters. More specifically, the present disclosure relates to a hybrid actuator for main rotor blade control flaps.

2. Description of Related Art

The operation and performance of helicopter rotor blades is significant to the overall performance of a helicopter. The vertical lift and the forward and lateral movement of the helicopter are all made possible by the operation of the rotor blades. A swashplate located around the rotating shaft of a helicopter is conventionally used to mechanically control the movement of blades by producing their pitch for rotor thrust control (tilt of thrust and thrust magnitude). The traditional method for producing the pitch motion is by directly driving at the blade root via the swashplate. But, the swashplate is an extremely complex, very heavy and maintenance intensive mechanical system. The elimination of the swashplate can result in many benefits such as reduced empty weight and drag, and increased maintainability.

Recently, on-blade control flaps have been used on the main rotor blades of helicopters to reduce the required power of actuation by controlling the pitch motion and higher harmonics of the blades during flight. Instead of the swashplate, the control flaps are driven by on-blade actuators, particularly, electromechanical actuators, that produce the pitch motion of the blades by directly driving at the flap. The control flaps deflect to induce a hinge moment on the blade via the aerodynamics of the air stream acting on the flap. This moment then generates the required pitch motion of the blade about the blade pitch axis with an order of magnitude less power than direct pitching of the blade. The control flaps can be used for both primary flight control (PFC) as well as vibration reduction and acoustic noise reduction. The flaps eliminate the need for a swashplate, swashplate linkages, main rotor servo flaps, pitch links, main rotor bifilar, and the associated hydraulic system. Unfortunately, prior art on-blade electromechanical actuators have not proven effective and thermally efficient for high harmonic control (HHC), which involves high frequency and low amplitude flapping of the flaps. Additionally, prior art on-blade actuators have proven to be very maintenance intensive.

Accordingly, there is need for on-blade actuation mechanisms that overcome, mitigate and/or alleviate one or more of the aforementioned and other deleterious effects of the prior art.

BRIEF SUMMARY OF THE INVENTION

These and other objects of the present disclosure are provided by a helicopter rotor blade that has a blade body and a control flap secured to the blade body. The rotor blade has a first primary mover capable of generating a first linear motion that is sufficient to generate a high amplitude, low frequency motion of the control flap; and a second primary mover capable of generating a second linear motion that is sufficient to generate a small amplitude, high frequency motion of the control flap. The separation of primary flight control from the high harmonic control allows each actuator to perform at their maximum efficiency and reduced thermal load. Further, the rotor blade has a coupling transmission for combining the first linear motion with the second linear motion that generates a cumulative linear motion; and a second transmission device that causes the cumulative linear motion to rotate the control flap.

These and other objects of the present disclosure are also provided by a hybrid actuator that has an electric machine that generates a rotational motion. Additionally, the hybrid actuator has a first transmission device that is capable of converting the rotational motion of the electric machine into a first linear motion. The hybrid actuator also has a solid-state, induced strain stack device that generates a second linear motion and a coupling transmission that combines the first linear motion with the second linear motion into a cumulative linear motion.

The above-described and other features and advantages of the present disclosure will be appreciated and understood by those skilled in the art from the following detailed description, drawings, and appended claims.

DETAILED DESCRIPTION OF THE INVENTION

Figure 1:
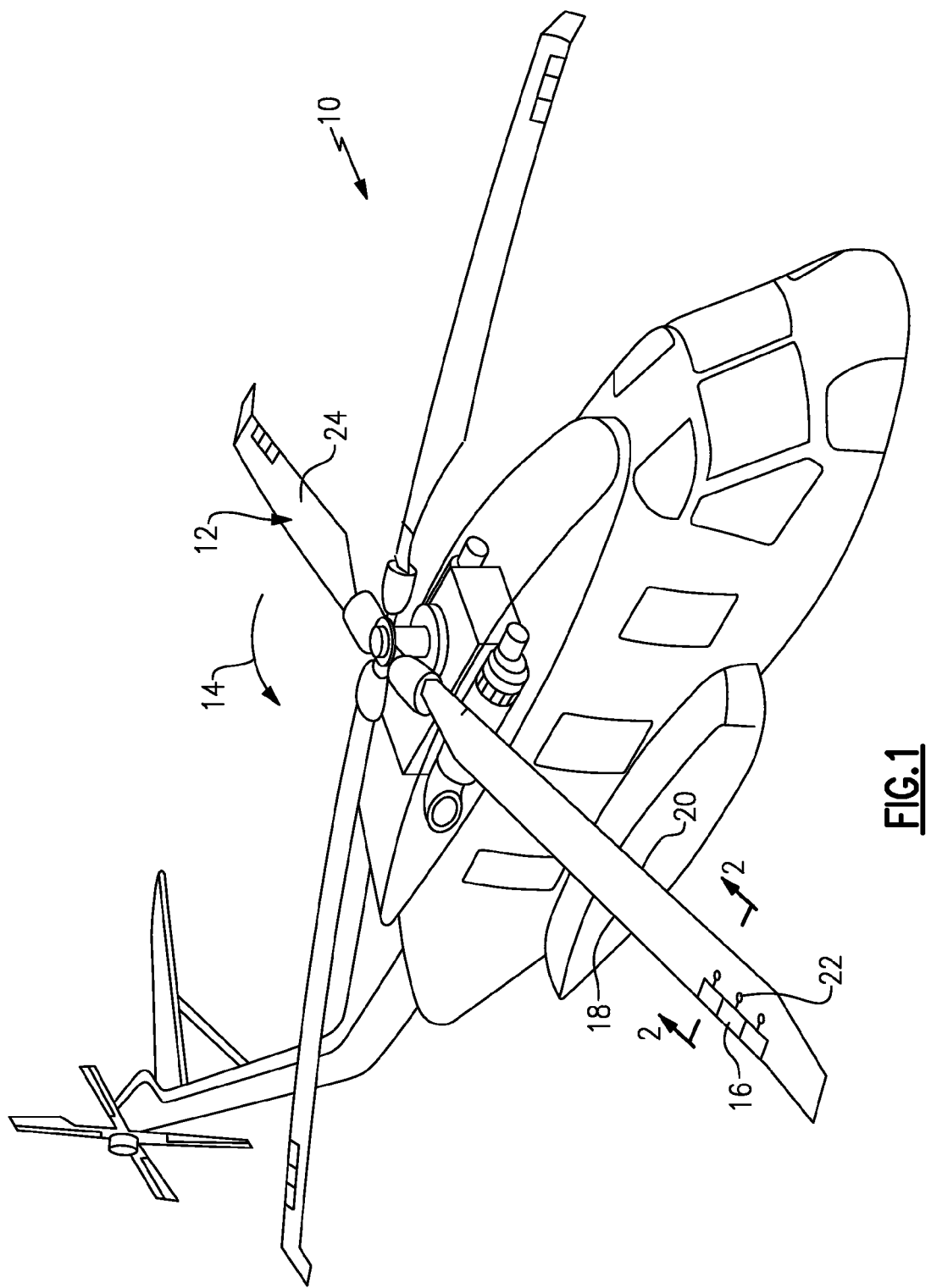
FIG. 1 illustrates a perspective view of a helicopter having rotor blades with control flaps that include an exemplary embodiment of a hybrid on-blade flap actuator according to the present disclosure.

Referring now to the drawings and in particular to FIG. 1, a helicopter generally referred to by reference number 10 is shown. Helicopter 10 includes one or more rotor blades 12 configured for rotation in a rotor direction 14. Each rotor blade 12 has a blade body 24 and one or more control flaps 16 (three shown) disposed thereon.

In the illustrated embodiment, control flaps 16 are disposed on a trailing edge 18 of rotor blade 12. As used herein, the trailing edge 18 is defined as the edge of rotor blade 12 that follows or trails the movement of the rotor blade as the blade is rotated in the rotor direction 14. Of course, it is contemplated by the present disclosure for control flaps 16 to be disposed on a leading edge 20 of the rotor blade 12. Additionally, it is contemplated by the present disclosure for control flaps 16 to be disposed on any combination of the trailing and leading edges 18, 20, respectively.

In accordance with the principles of the present disclosure, the pitch of each control flap 16 is controlled by a hybrid actuator 22 on board each blade 12. In this manner and when used on the trailing edge 18, control flaps 16 can be used to replace the swashplate of the prior art.

Advantageously, hybrid actuator 22 includes both first primary mover 32, and second primary mover 36. When first and second primary movers 32, 36 are combined together, actuator 22 can provide the required blade pitching motions, with controllable frequency and amplitude for both primary flight control and high harmonic control. For example, the primary flight control (PFC) requires low frequency and high amplitude movement of the control flaps 16 that is achieved by the first primary mover 32, while the high harmonic control (HHC) requires high frequency and low amplitude movement of the control flap that is achieved by the second primary mover 36.

Figure 2:
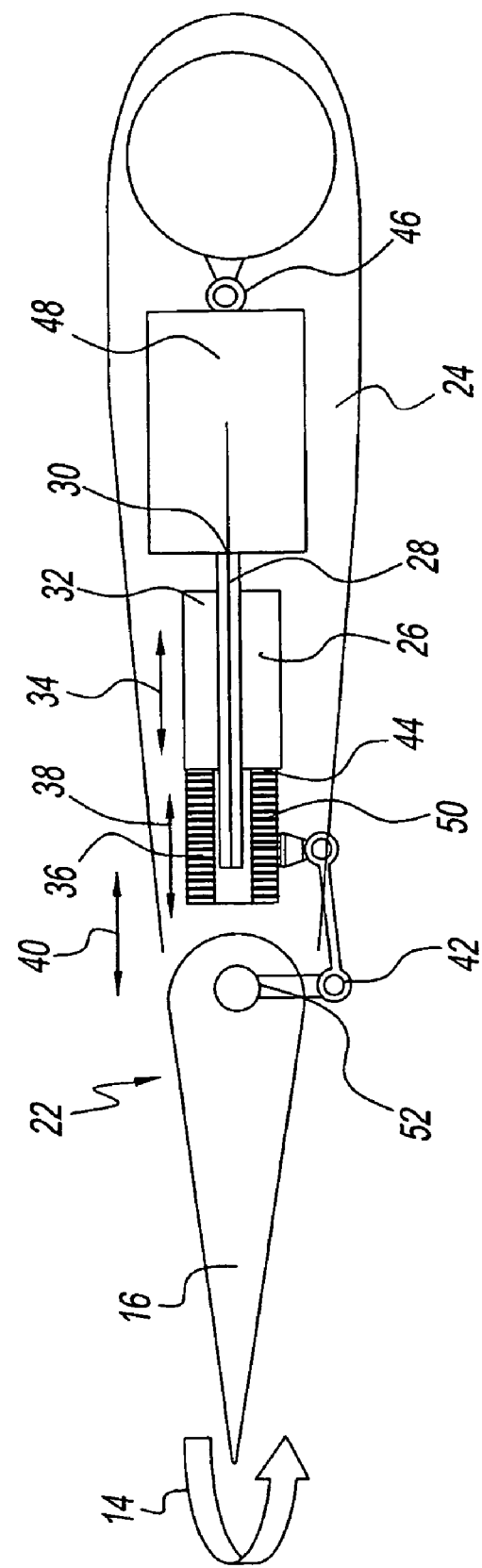
FIG. 2 is a sectional view of the rotor blade of FIG. 1 illustrating a first exemplary embodiment of a hybrid on-blade flap actuator according to the present disclosure.

Referring now to FIG. 2, an exemplary embodiment of hybrid actuator 22 according to the present disclosure is shown. In the illustrated embodiment, first primary mover 32 includes an electric machine 48, connected to a first transmission device 26 via a motor shaft 28. Electric machine 48 is secured in blade body 24 at connector 46 so that the machine can rotate motor shaft 28 about an axis of rotation 30 in either direction. In a preferred embodiment, electric machine 48 is a geared electric motor. First primary mover 32 generates a first thermal load on electric machine 48.

First transmission device 26 converts the rotational motion of shaft 28 into a first linear motion 34 in a direction parallel to axis of rotation 30. First transmission device 26 can be any device capable of converting the rotational motion of shaft 28 to first linear motion 34. For example, first transmission device 26 can be a planetary roller screw mechanism, a ball screw mechanism, and others. In this manner, first primary mover 32 is configured to provide first linear motion 34.

First primary mover 32 is connected to second primary mover 36 by a coupling transmission device 44. Second primary mover 36 generates an independent, second linear motion 38. Coupling transmission device 44 is configured to add or subtract the second linear motion 38 to/from first linear motion 34 to produce a cumulative linear motion 40. In the illustrated embodiment, second primary mover 36 is a solid-state, induced strain stack device 50. Here, first transmission device 26 is directly connected to induced strain stack device 50. Thus, in this embodiment, coupling transmission device 44 is provided by the direct connection of first and second primary movers 32, 36. Second primary mover 36 generates a second thermal load on stack device 50.

Cumulative linear motion 40 drives control flap 16 about a shaft 52 via a second transmission device 42. Second transmission device 42 can be any device capable of converting cumulative linear motion 40 into a rotary motion 14 of control flap 16 about shaft 52.

First linear motion 34 is capable of generating low frequency and large amplitude changes in rotary motion 14. Conversely, second linear motion 38 is capable of generating high frequency and small amplitude changes in rotary motion 14.

Stack device 50 can be, for example, a high strain single crystal piezoelectric stack, a magnetostrictive stack, a TERFENOL-D stack, any other induced strain devices, and any combinations thereof. In the illustrated embodiment, stack device 50 is configured as an annual cylinder connected to first transmission device 26 so that motor shaft 28 can move through the stack device during cumulative linear movement 40.

Advantageously, actuator 22 shifts the thermal burden of high harmonic control (HHC) from motor 48 to induced strain stack device 50. Additionally, actuator 22 combines the two independent linear motions 34, 38 in a very simple, compact and reliable fashion. In the embodiment of FIG. 2, actuator 22 includes coupling transmission device 44 that combines linear motions 34, 38 into cumulative linear motion 40 by connecting motor 48 and induced strain stack device 50 to one another in series. When configured in series, the first linear motion 34 and the second linear motion 38 are on the same axis. This configuration keeps the first thermal load on electric machine 48 remote from the second thermal load on stack device 50 when the two independent linear motions 34, 38 are combined. Thus, the overall thermal load on actuator 22 is minimized.

Figure 3:
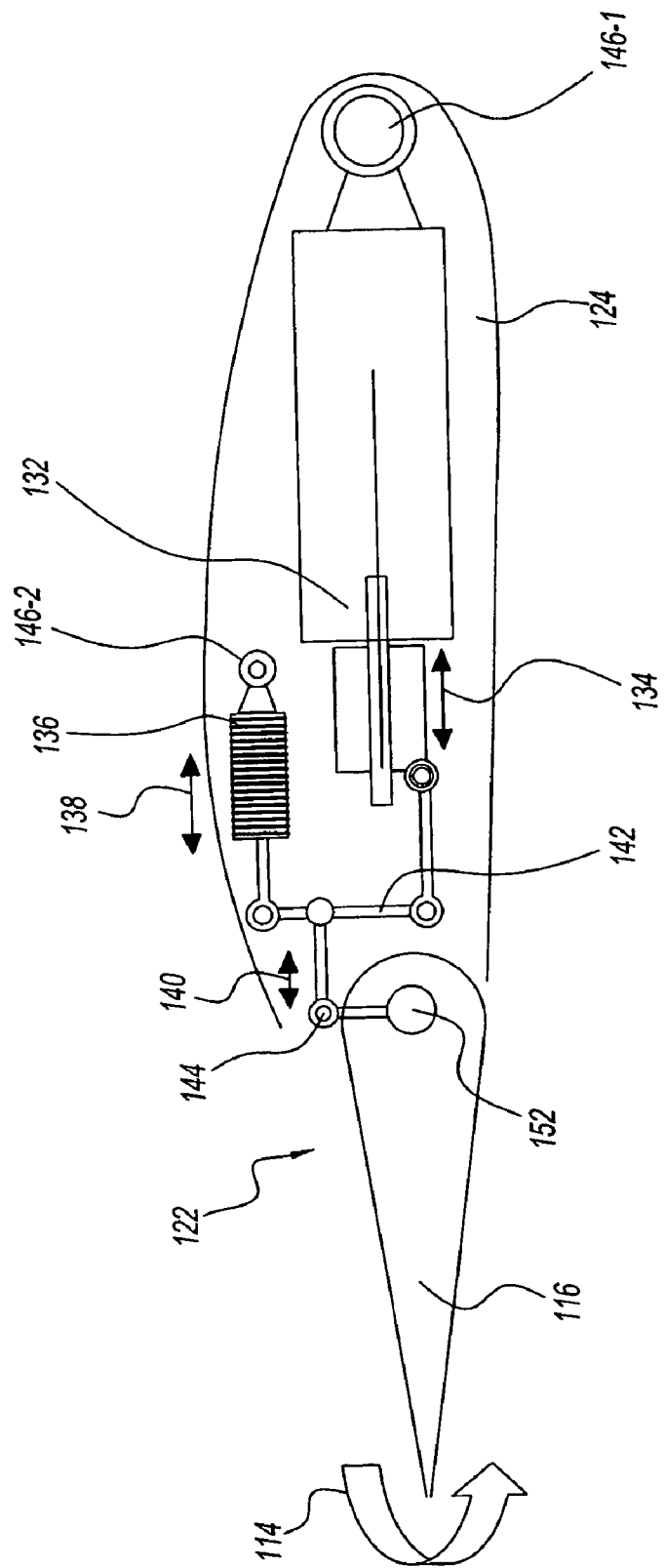
FIG. 3 is a sectional view of a second exemplary embodiment of a hybrid on-blade flap actuator according to the present disclosure.

Referring now to FIG. 3, a second exemplary embodiment of a hybrid actuator 122 according to the present disclosure is shown in which component parts performing similar or analogous functions are labeled in multiples of one hundred.

Actuator 122 has a coupling transmission device 144 that is capable of combining a first linear motion 134 that is generated from a first primary mover 132, with a second linear motion 138 that is generated from a second primary mover 136. The coupling transmission device 142 combines first linear motion 134 with second linear motion 138 to produce a cumulative linear motion 140.

In this embodiment, first primary mover 132 and second primary mover 136 are each rigidly secured to blade body 124 by connections 146-1, 146-2, respectively.

In the embodiment of FIG. 3, actuator 122 includes coupling transmission 142 that combines linear motions 134, 138 into cumulative linear motion 140 by connecting first primary mover 132 and second primary mover 136 to one another in parallel. When configured in parallel, the first linear motion 134 and the second linear motion 138 are on different axes from one another.

Cumulative linear motion 140 drives control flap 116 about a shaft 152 via a second transmission device 144. Second transmission device 144 can be any device capable of converting cumulative linear motion 140 into a rotary motion 114 of control flap 116 about shaft 152.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. A helicopter rotor blade comprising:
   a blade body;
   a control flap rotatably secured to said blade body;
   a first primary mover operable to generate a first linear motion, said first linear motion operable to generate a high amplitude, low frequency motion of said control flap to provide primary flight control;
   a second primary mover operable to generate a second linear motion, said second linear motion operable to generate a low amplitude, high frequency motion of said control flap to provide high harmonic control;
   a coupling transmission device operable to combine said first linear motion with said second linear motion to generate a cumulative linear motion; and
   a second transmission device to pitch said control flap relative to said blade body in response to said cumulative linear motion.

2. The helicopter rotor blade of claim 1, wherein said coupling transmission device comprises a rigid connection between said first and second primary movers.

3. The helicopter rotor blade of claim 1, wherein said first primary mover comprises an electric machine rotating a motor shaft and a first transmission device converting a rotary motion of said motor shaft into said first linear motion.

4. The helicopter rotor blade of claim 3, wherein said electric machine is a geared electric motor.

5. The helicopter rotor blade of claim 3 wherein said electric machine is secured to said blade body via a connector so that said electric machine can rotate said motor shaft about an axis of rotation in either direction.

6. The helicopter rotor blade of claim 5, wherein said first linear motion is in a direction parallel to said axis of rotation.

7. The helicopter rotor blade of claim 3, wherein said first primary mover generates a first thermal load on said electric machine.

8. The helicopter rotor blade of claim 3, wherein said first transmission device comprises a planetary roller screw mechanism or a ball screw mechanism.

9. The helicopter rotor blade of claim 3, wherein said first transmission device and said second transmission device are configured in series.

10. The helicopter rotor blade of claim 3, wherein said first transmission device and said second transmission device are configured in parallel.

11. The helicopter rotor blade of claim 1, wherein said second primary mover comprises a solid-state, induced strain stack device.

12. The helicopter rotor blade of claim 11, wherein said second primary mover generates a second thermal load on said stack device.

13. The helicopter rotor blade of claim 12, wherein said first thermal load is maintained on said first primary mover remote from said second thermal load on said second primary mover.

14. The helicopter rotor blade of claim 12, wherein said second thermal load is maintained on said second primary mover remote from said first thermal load on said first primary mover.

15. The helicopter rotor blade of claim 11, wherein said stack device comprises a device selected from the group consisting of a high strain single crystal piezoelectric stack, a magnetostrictive stack, and a TERFENOL-D stack.

16. The helicopter rotor blade of claim 1, wherein said first primary mover and said second primary mover are configured in series.

17. The helicopter rotor blade of claim 16, wherein first transmission device and said coupling transmission device are configured in series.

18. The helicopter rotor blade of claim 1, wherein said first primary mover and said second primary mover are configured in parallel.

19. The helicopter rotor blade of claim 18, wherein said first transmission device and said coupling transmission device are configured in parallel.

20. A helicopter rotor blade comprising:
a blade body;
a control flap rotatably secured to said blade body;
a first primary mover operable to generate a first linear motion, said first primary mover includes an electric machine operable to rotate a motor shaft and a first transmission device which converts a rotary motion of said motor shaft into said first linear motion, said first linear motion operable to generate a high amplitude, low frequency motion of said control flap;
a second primary mover operable to generate a second linear motion, said second linear motion operable to generate a low amplitude, high frequency motion of said control flap;
a coupling transmission device for combining said first linear motion with said second linear motion to generate a cumulative linear motion, said second primary mover includes a solid-state, induced strain stack device configured as an annual cylinder so that said motor-shaft extends at least partially through said solid-state, induced strain stack device; and
a second transmission device to pitch said control flap relative to said blade body in response to said cumulative linear motion.

21. A hybrid actuator comprising:
an electric machine that generates a rotational motion;
a first transmission device operable to convert said rotational motion into a first linear motion, said first linear motion operable to generate a high amplitude, low frequency motion;
a solid-state, induced strain stack device that generates a second linear motion, said second linear motion operable to generate a low amplitude, high frequency motion; and
a coupling transmission device that combines said first linear motion with said second linear motion into a cumulative linear motion; and
a second transmission device to convert said cumulative linear motion to a rotational motion.

22. The hybrid actuator of claim 21, wherein said first transmission device and said coupling transmission device are configured in series.

23. The hybrid actuator of claim 21, wherein said first transmission device and said coupling transmission device are configured in parallel.

24. The hybrid actuator of claim 21, wherein said rotational motion is a pitch motion of a rotor blade control flap relative to a rotor blade body to which said rotor blade control flap is mounted.

* * * * *